United States Patent
Jellentrup et al.

(10) Patent No.: US 11,845,463 B2
(45) Date of Patent: Dec. 19, 2023

(54) DYNAMIC AR NOTICE

(71) Applicant: Volkswagen Aktiengesellschaft, Wolfsburg (DE)

(72) Inventors: Nina Jellentrup, Braunschweig (DE); Ulrich Wuttke, Braunschweig (DE); Adrian Haar, Hannover (DE); Yannis Tebaibi, Braunschweig (DE); Michael Wittkämper, Braunschweig (DE); Alexander Kunze, Berlin (DE); Vitalij Sadovitch, Braunschweig (DE); Marco Danneberg, Hohenwarth (DE); Johanna Sandbrink, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 17/696,661

(22) Filed: Mar. 16, 2022

(65) Prior Publication Data
US 2022/0297715 A1    Sep. 22, 2022

(30) Foreign Application Priority Data

Mar. 18, 2021  (DE) .......................  10 2021 202 666

(51) Int. Cl.
*B60W 50/14*    (2020.01)
*B60K 35/00*    (2006.01)

(52) U.S. Cl.
CPC ............ *B60W 50/14* (2013.01); *B60K 35/00* (2013.01); *B60K 2370/1529* (2019.05);
(Continued)

(58) Field of Classification Search
CPC . B60W 50/14; B60W 2050/146; B60K 35/00; B60K 2370/1529; B60K 2370/177; B60K 2370/193; B60K 2370/1868
See application file for complete search history.

(56) References Cited

U.S. PATENT DOCUMENTS 6,373,472 B1 *   4/2002  Palalau ............... B60Q 1/0082
                                                         345/173
10,332,292 B1    6/2019  Arnicar et al.
(Continued)

FOREIGN PATENT DOCUMENTS

DE    19539799 A1    5/1996    ............ B60K 35/00
DE    10312719 A1    10/2004   ............ G01C 21/36
(Continued)

OTHER PUBLICATIONS

German Office Action, Application No. 102021202666.4. 9 pages, dated Nov. 24, 2021.

*Primary Examiner* — Chico A Foxx
(74) *Attorney, Agent, or Firm* — Slayden Grubert Beard PLLC (57) ABSTRACT

The disclosure relates to a device for the improved visualization of a notice in a motor vehicle. A contact-analog head-up display places information in direct contact with the environment. In contrast to conventional head-up displays, the information appears as part of the environment. Some embodiments provide an information container that is placed at a distance x from the vehicle which grows corresponding to the reduction of the distance x, and is placed fixed relative to the environment to produce the effect of a container located in reality. The necessity of an interaction may be communicated by the element remaining stationary. That is, shortly before the position of the information container is reached, it remains immobile in the field of vision and is "pushed" in front of the ego vehicle. This makes it imme-
(Continued)

diately apparent that an operation is needed to acknowledge the pop-up respectively to thereby trigger an action.

20 Claims, 4 Drawing Sheets

(52) U.S. Cl.
CPC .......................... *B60K 2370/177* (2019.05); *B60K 2370/1868* (2019.05); *B60K 2370/193* (2019.05); *B60W 2050/146* (2013.01)

(56) References Cited

U.S. PATENT DOCUMENTS

| | | | |
|---|---|---|---|
| 10,510,276 B1* | 12/2019 | Lee | G09G 3/001 |
| 2005/0273252 A1* | 12/2005 | Nix | G01C 21/3632 |
| | | | 340/995.16 |
| 2012/0224060 A1* | 9/2012 | Gurevich | G06V 20/582 |
| | | | 348/148 |
| 2013/0286206 A1* | 10/2013 | Ozaki | H04N 7/18 |
| | | | 348/148 |
| 2015/0278614 A1* | 10/2015 | Lee | B60W 50/14 |
| | | | 348/148 |
| 2015/0283902 A1* | 10/2015 | Tuukkanen | G06V 20/597 |
| | | | 340/461 |
| 2015/0331487 A1 | 11/2015 | Roth et al. | 345/156 |
| 2016/0052394 A1* | 2/2016 | Yamada | G01C 21/365 |
| | | | 701/93 |
| 2016/0073031 A1* | 3/2016 | Watanabe | G02B 27/0149 |
| | | | 345/7 |
| 2016/0264048 A1* | 9/2016 | Ng-Thow-Hing | B60Q 9/008 |
| 2016/0266390 A1* | 9/2016 | Seo | G09G 3/001 |
| 2017/0025005 A1* | 1/2017 | Barth | G08G 1/166 |
| 2017/0132922 A1* | 5/2017 | Gupta | H04L 67/12 |
| 2017/0287217 A1* | 10/2017 | Kim | B62J 50/22 |
| 2017/0370736 A1* | 12/2017 | Singh | G01C 21/3484 |
| 2018/0090007 A1* | 3/2018 | Takemori | G08G 1/166 |
| 2018/0257548 A1* | 9/2018 | Suzuki | B60Q 1/525 |
| 2018/0345965 A1* | 12/2018 | Payne | B60W 30/143 |
| 2019/0033855 A1* | 1/2019 | Mathe | B60W 50/10 |
| 2019/0204104 A1 | 7/2019 | Kimura | |
| 2019/0213932 A1* | 7/2019 | Yoneyama | B60Q 9/008 |
| 2020/0050856 A1* | 2/2020 | Chikkaveerappa | G06V 20/20 |
| 2020/0064640 A1* | 2/2020 | Nagano | G02B 27/0179 |
| 2020/0175865 A1* | 6/2020 | Han | H04B 1/385 |
| 2020/0180619 A1* | 6/2020 | Lee | B62D 15/025 |
| 2020/0184809 A1* | 6/2020 | Lee | G06V 20/588 |
| 2020/0298703 A1* | 9/2020 | Max | G01C 21/365 |
| 2020/0324787 A1 | 10/2020 | Wang et al. | |
| 2020/0361472 A1* | 11/2020 | Baumgarten | B60W 50/14 |
| 2021/0150904 A1* | 5/2021 | Nagata | B60Q 9/008 |
| 2021/0319237 A1* | 10/2021 | Kim | G06V 20/588 |
| 2021/0390926 A1* | 12/2021 | Kunze | G09G 5/10 |
| 2022/0042813 A1* | 2/2022 | Ko | G01C 21/3658 |
| 2022/0075445 A1* | 3/2022 | Leroux | G08B 21/00 |
| 2022/0130296 A1* | 4/2022 | Kamiya | B60K 35/00 |
| 2022/0172652 A1* | 6/2022 | Yagyu | G08G 1/16 |
| 2022/0203834 A1* | 6/2022 | Nakao | B60K 35/00 |
| 2022/0212689 A1* | 7/2022 | Nakao | G08G 1/0962 |
| 2023/0048230 A1* | 2/2023 | Lee | B62D 15/025 |

FOREIGN PATENT DOCUMENTS

| | | | | |
|---|---|---|---|---|
| DE | 102015209004 A1 | 11/2016 | .......... | B60W 30/182 |
| DE | 102020002992 A1 | 3/2021 | ............ | G01C 21/36 |
| EP | 3343177 A1 | 7/2018 | ............ | G01C 21/36 |
| JP | 2014006147 A * | 1/2014 | | |

* cited by examiner

DYNAMIC AR NOTICE

CROSS-REFERENCE TO RELATED APPLICATIONS

This application claims priority to German Patent Application No. DE 10 2021 202 666.4, filed on Mar. 18, 2021 with the German Patent and Trademark Office. The contents of the aforesaid Patent Application are incorporated herein for all purposes.

TECHNICAL FIELD

The invention relates to a device for the improved visualization of a notice in a motor vehicle, as well as a corresponding system, method and computer program.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Informative pop-ups are an integral component of modern interactive systems such as computers, smart phones, tablets and vehicles as well. Conventional implementations frequently work with timeouts to limit the display time of the information which is generally only temporarily relevant, for example of incoming messages or, in a vehicle context, information on the vehicle state such as "add washer fluid". With this implementation, however, the user cannot predict specifically how long the pop-up will still be visible. Moreover, the basically temporary character is not immediately apparent. Whether or not an operation is necessary is therefore unclear to the user. Given a limited field of view in head-up displays, it is moreover technically most often impossible to directly mark objects in the environment. Even with a maximum field of view, i.e., with 100% windshield coverage, relevant objects are only visible very belatedly, or respectively are only very briefly visible, especially at a high speed.

SUMMARY

A need exists to create an improved option for making information understandable to a driver and conveying it in and easily detectable manner. For example, the driver should be able to direct his vision to the course of the road.

The need is addressed by a device for the improved visualization of a notice in a motor vehicle according to the independent claims. Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a device for the improved visualization of a notice in a motor vehicle comprises:
  an input interface for receiving notice data with information on the notice and vehicle data with information on a vehicle state;
  an analysis circuit for determining a depiction of the notice based on the notice data and the vehicle data, and for generating a control command to control an AR display based on the depiction of the notice;
  an output interface for transmitting the control command to the AR display, wherein the control command causes a dynamic depiction of the notice, wherein a validity range may be conveyed for the notice by using the dynamics of the depiction of the notice.

In some embodiments, a system for the improved visualization of a notice in a motor vehicle is provided, comprising:
  a device as defined above; and
  an AR display, for example a head-up display in a motor vehicle, for outputting a dynamic depiction of the notice in reaction to a control command from the device.

In some embodiments, a method for the improved visualization of a notice in a motor vehicle is provided, comprising:
  receiving notice data with information on the notice and vehicle data with information on a vehicle state;
  determining a depiction of the notice based on the notice data and the vehicle data;
  generating a control command for controlling an AR display based on the depiction of the notice;
  transmitting the control command to the AR display, wherein the control command causes a dynamic depiction of the notice, wherein a validity range may be conveyed for the notice by using the dynamics of the depiction of the notice.

By means of an input interface, a cost-efficient device may be created that for example may be used with available systems, modules and units installed in the motor vehicle. An input interface may be designed to be wired and/or wireless, and may for example support one or more communication protocols. By means of an analysis circuit (e.g., comprising hardware circuitry and/or software, for example a processor, microprocessor, microcontroller, FPGA with or without suitable software), a beneficial depiction of the notice may be determined in which visibility of the notice icon to the driver is increased, and the driver may intuitively easily detect a validity range of the notice. Since a beneficial depiction may be determined based on the notice data and the vehicle data, a notice icon to be displayed may be responded to dynamically and depending on the situation. Safety in road traffic is increased. An output interface enables a cost-effective device that may for example be used with available output devices. By using an input interface for receiving data with information on the notice for the driver, a technically simple and economical device may be created that, for example, does not itself have to be designed to detect to the information. Accordingly, the device may be integrated in already existing navigation or infotainment systems in some embodiments. By means of an output interface and in some embodiments, components already installed in the motor vehicle may be used for displaying. It is furthermore conceivable to retrofit an AR display and/or use several AR displays in combination. For example, the beneficial depiction comprises a container that is located in a region in front of the motor vehicle.

Some embodiments provide that the output interface is designed to transmit the control command to an AR display in the form of an AR HUD, and is for example designed to be installed in a motor vehicle, and is in some embodiments part of an onboard computer, infotainment system, and/or navigation system. This allows the driver to select a configuration that is understandable for him. The acceptance, the comfort and the understandability of the system may be improved and enhanced. A control command for an AR HUD enables improved visualization of the information for a driver. For example, a driver may direct his sight toward the roadway and does not have to look at an additional display in the motor vehicle. Safety in road traffic is increased.

Some embodiments provide that the analysis circuit determines a control command that causes a dynamic depiction of the notice which comprises a depiction of a countdown, wherein the countdown for example may be graphically depicted as a bar and/or numerically as a percentage. This allows the validity range, for example a validity duration, of the notice to be conveyed to the driver in a directly understandable manner.

Some embodiments provide that the validity range for the notice comprises a locality-, time- and/or vehicle state-dependent validity. Consequently, only one notice is output when the driver is to be transmitted information, or an activity is to be performed by the driver. The acceptance, the comfort and the understandability of the system may be improved and enhanced. For example, it may be prevented that the field of view is not overloaded by unnecessary notices. For example, a permissible maximum speed may only be displayed when a driver exceeds the permissible maximum speed or a predefined threshold value.

Some embodiments provide that the input interface is designed to receive vehicle data with information on a vehicle state, wherein the vehicle state comprises a speed, orientation, and/or position of the motor vehicle. This makes it possible to better determine the validity range for the notice. For example, the validity range may be dynamically determined for the particular driving situation. Comfort is increased.

Some embodiments provide that the analysis circuit determines a control command that causes a dynamic depiction of the notice in the form of an information container, wherein the information container is located at a predefined distance from the motor vehicle which is fixed relative to the environment by augmented reality. The information container may grow corresponding to the reduction of the distance to produce the effect of a container located in reality. This allows a driver to intuitively recognize the validity range of the notice. The driver may concentrate on driving since he has detected the notice including the validity range, such as for example a traffic sign. The driver does not have to be trained. The device may convey highly intuitive information.

Some embodiments provide that the analysis circuit determines a control command which causes the information container to disappear upon reaching its position located in the environment, for example based on whether the information container comprises temporarily relevant information, or causes the information container to remain in front of the motor vehicle while and after reaching its position located in the environment, for example based on whether an operation by the driver is necessary. This makes it possible to notify the driver, if necessary, of the necessity of an operation in a subtle and directly understandable manner.

Some embodiments result from the remaining features specified in the dependent claims. For example, it may be provided in some embodiments that a contact-analog head-up display places information in direct contact with the environment. In contrast to conventional head-up displays, the information appears as part of the environment. The subject matter of some embodiments is the placement of an information container at a distance x from the vehicle that grows corresponding to the reduction of the distance x, and is placed fixed relative to the environment to produce the effect of a container located in reality. As a consequence of the direct reference to reality, it is obvious that the container disappears upon reaching its position located in the environment, that is, there is clear communication that and when the information disappears. In contrast to this, the necessity of an interaction may be communicated by the element remaining stationary. That is, shortly before the position of the information container is reached, it remains immobile in the field of vision and is "pushed" in front of the ego vehicle. This makes it immediately apparent that an operation is needed to acknowledge the pop-up, or respectively to thereby trigger an action, such as route guidance. Of course, this type of 3D pop-ups may be used for many types of information, for example to communicate the remaining distance to the navigation goal, to communicate nearby charging stations and other points of interest such as sightseeing objects.

The various embodiments mentioned in this disclosure may be combined with one another, unless designed otherwise in individual cases.

The head-up display (HUD) is a display system in which the user may keep his viewing direction and therefore his head angle because the information is projected into his field of view. In addition to pilots, automobile drivers inter alia belong to the users. For example, augmented reality (AR) may be combined with an HUD. AR means a computer-assisted expansion of the perception of reality. This information may correspond to all human sensory modalities. Frequently however, augmented reality is only understood to mean the visual depiction of information, i.e., the addition of images or videos with computer-generated additional information on virtual objects by means of inserting/overlaying.

An information container may for example comprise a border of a notice to make it possible for the driver to better locate, and more clearly recognize, and more easily detect the notice.

Reference will now be made to the drawings in which the various elements of embodiments will be given numerical designations and in which further embodiments will be discussed.

In the exemplary embodiments described herein, the described components of the embodiments each represent individual features that are to be considered independent of one another, in the combination as shown or described, and in combinations other than shown or described. In addition, the described embodiments can also be supplemented by features other than those described.

Specific references to components, process steps, and other elements are not intended to be limiting. Further, it is understood that like parts bear the same or similar reference numerals when referring to alternate FIGS.

Figure 1:
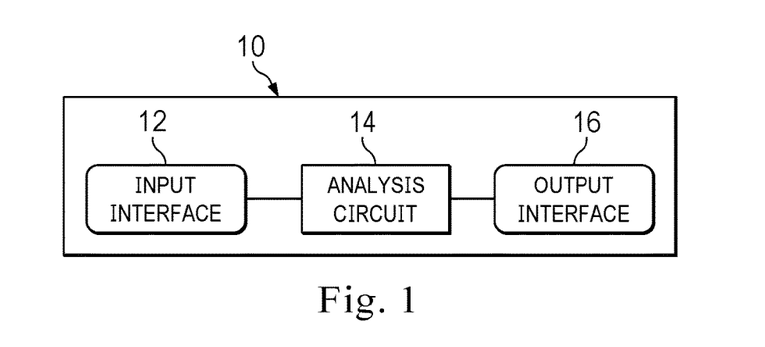
FIG. 1 shows a schematic depiction of an embodiment of a device for the improved visualization of a notice in a motor vehicle.

FIG. 1 shows a schematic depiction of a device 10 for the improved visualization of a notice in a motor vehicle. The device 10 comprises an input interface 12, an analysis circuit 14 and an output interface 16.

The input interface 12 is designed to receive data comprising notice data with information on the notice, and vehicle data with information on a vehicle state. The data may for example comprise a speed or a navigation notice and, for example, originate from a tachometer, GPS receiver, and/or navigation system. Furthermore, the data may comprise sensor data from a driving assistance system such as a detected preceding vehicle, a recognized sign, or the like. For receiving, the input interface 12 is for example connected to a vehicle-internal transmission network. Furthermore, the input interface 12 may also be designed for wireless communication or be connected to a proprietary, e.g., wired transmission network.

The analysis circuit 14 is designed to receive the data and generate a control command, wherein the control command causes a dynamic depiction of the notice, wherein a validity range may be conveyed for the notice by using the dynamics of the depiction of the notice. The validity range may for example comprise a time-, location- and/or a vehicle state-dependent validity. The analysis circuit 14 determines a depiction of the notice based on the notice data and the vehicle data. A depiction may for example be a modification of the size, color, color saturation, transparency, a simplification of a notice icon, and/or a duration of the depiction of one or more notice icons.

The output interface 16 is designed to transmit a control command to an AR display. The output interface 16 may be designed analogous to the input interface 12 for communicating. Of course, the input interface 12 and the output interface 16 may also be designed combined as a communication interface for sending and receiving.

Figure 2:
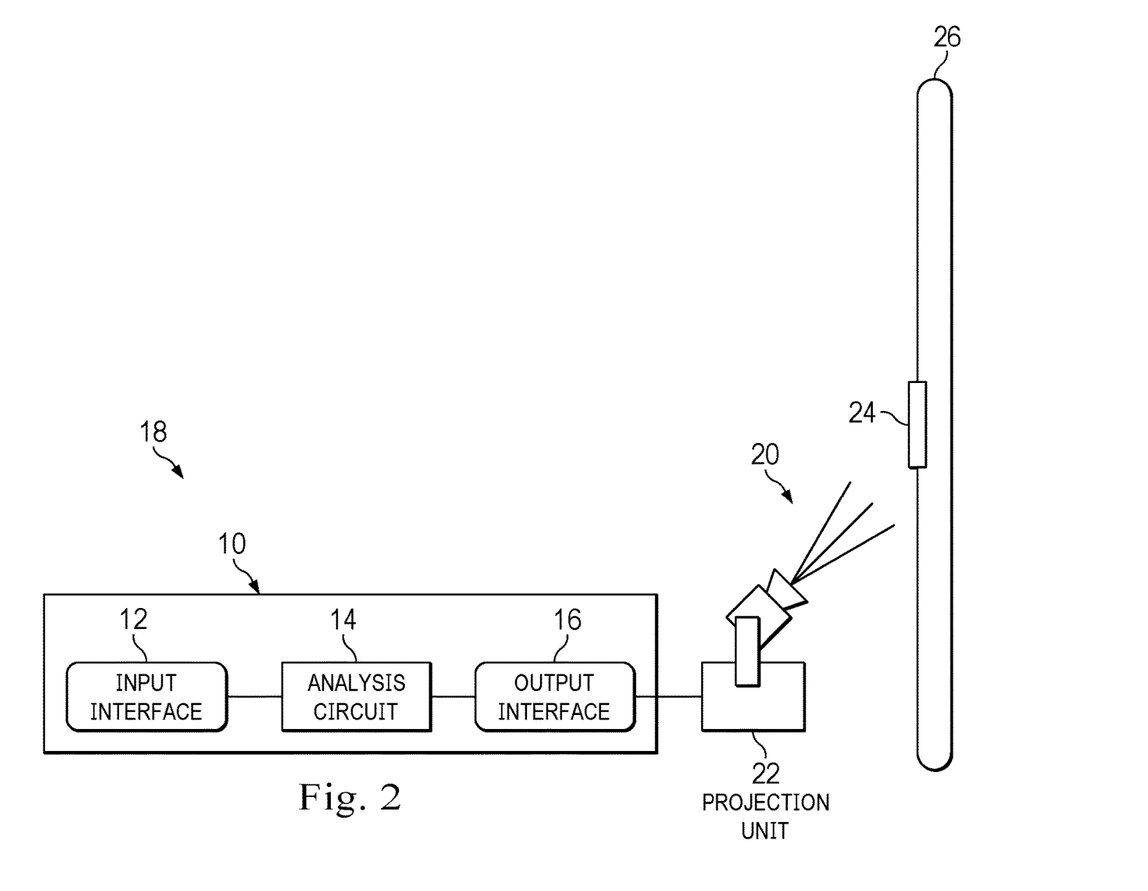
FIG. 2 shows a schematic depiction of an embodiment of a system for the improved visualization of a notice in a motor vehicle.

FIG. 2 shows a schematic depiction of a system 18 according to some embodiments with a device 10 and an AR display 20 with a projection unit 22.

The device 10 receives data comprising notice data and/or vehicle data. This data may for example be a speed of the motor vehicle, data from an eye tracking sensor, data on the traffic situation, motor vehicle position data, data concerning a position of a hazard source, navigation data, and an orientation of the motor vehicle.

Based on the data, the device 10 creates a control command for the AR display 20 and thereby brings about a depiction, for example in the form of a dynamic, modified output of a notice 24 on a front windshield 26 of a motor vehicle. In the shown example, the AR display 20 comprises a head-up display, wherein the projection unit 22 is designed to be movable and for example may be moved by actuators so that the notice 24 may be projected onto the front windshield 26 at a position in the field of view of the driver. For example, a size of the notice 24 may be varied. This allows the notice 24 to be directly displayed on the front windshield 26 of the motor vehicle.

Figure 3:
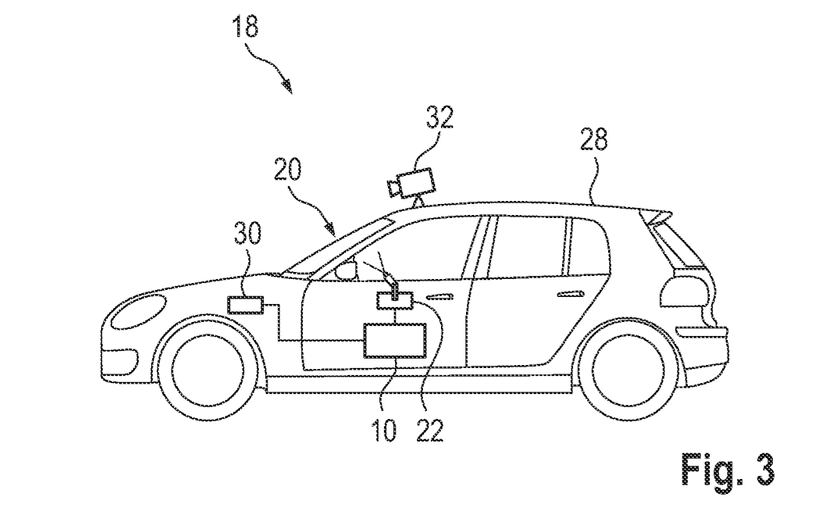
FIG. 3 shows a schematic depiction of another embodiment of a system for the improved visualization of a notice in a motor vehicle.

FIG. 3 shows a schematic depiction of a variant of the system 18 according to some embodiments in a motor vehicle 28. This system 18 comprises a device 10 and an AR display 20. In the shown example, the AR display 20 comprises a projection unit 22 that may be projected onto the front windshield 26 (not shown in greater detail) of the motor vehicle 28.

As described above, the device 10 receives data comprising notice data and/or vehicle data. In the shown example, the system 18 is connected to a vehicle system 30 such as for example a navigation system, and receives navigation data. Of course, the system 18 may also be designed with the navigation system as an independent unit. In the shown example, the navigation system may form a unit that determines information such as a navigation request that is to be transmitted to a driver. Additional data may originate from a front camera 32, for example to determine a situation in front of the motor vehicle 28. Of course, other sensors may be used that are in principle known in the prior art. For example, data from several sensors may be fused to achieve a higher data quality. Furthermore, the vehicle system 30 may also comprise a control device of the motor vehicle 28, wherein by means of the notice 24, a necessary operation such as fill the washer fluid, exchange defective lamps, etc. may be conveyed to the driver.

The device 10 analyzes the received data and determines a control command which causes a dynamic depiction of the notice 24, wherein a validity range for the notice 24 may be conveyed by using the dynamics of the depiction of the notice 24. The notice 24 may be output and recognized by a driver according to the depiction as described above.

Figure 4:
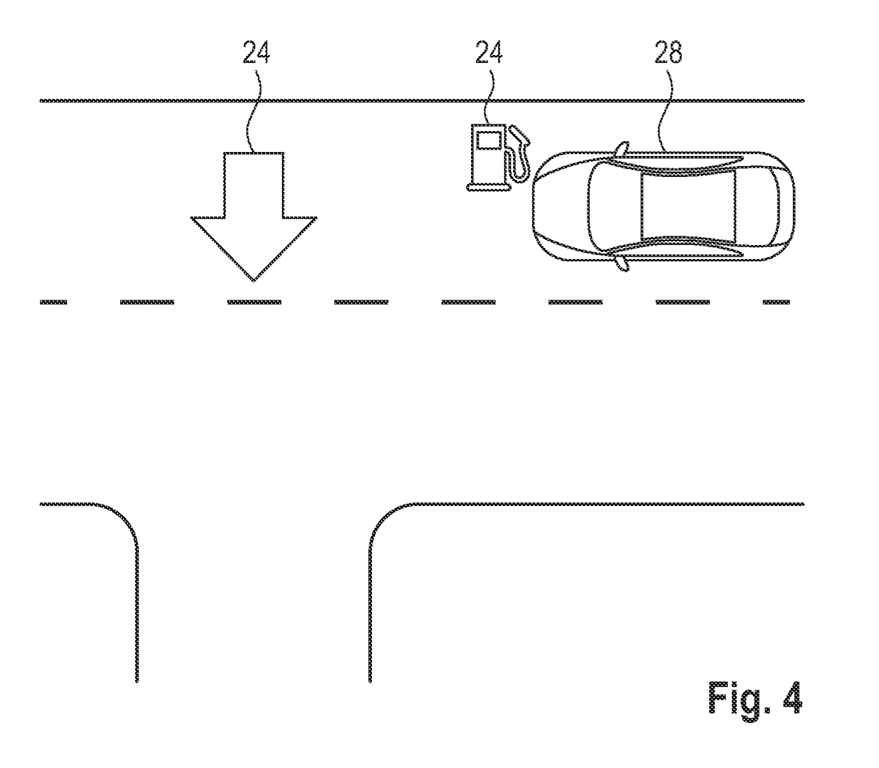
FIG. 4 shows a schematic example depiction of a situation in road traffic from a bird's-eye perspective.

FIG. 4 schematically shows a situation in road traffic in which the motor vehicle 28 receives a navigation notice to turn left in the driving direction into a junction. This notice 24 is located at the level of the junction in the driving direction. Furthermore, a sensor (not shown) of the motor vehicle 28 recognizes that the motor vehicle 28 may need to be filled up. Consequently, the notice 24 that asks the driver to fill up is already located in front of the motor vehicle 28 and is shown in this example as if the notice 24 were being pushed in front of the motor vehicle 28.

Of course, the depiction of the notice 24 on the roadway is only schematically and greatly simplified. Furthermore, the type of the notice 24, and the information associated therewith, and/or the request for the driver are of course only selected as examples.

Figure 5A:
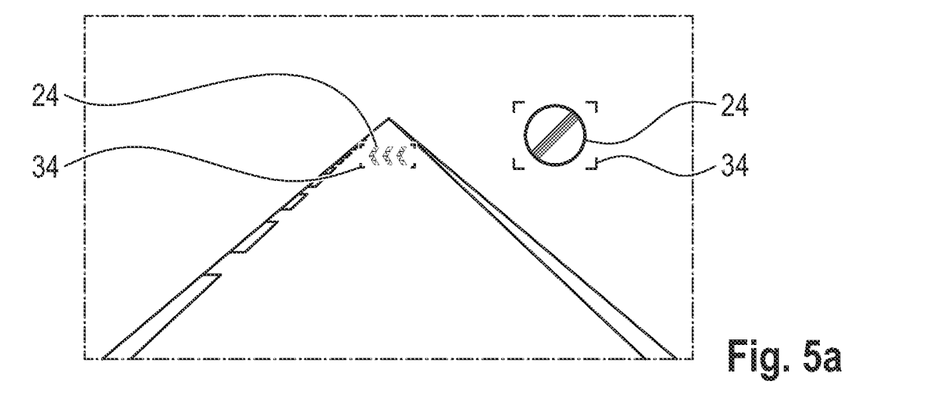
FIG. 5a-c show schematic example depictions of an output of a system on an AR display.
Figure 5B:
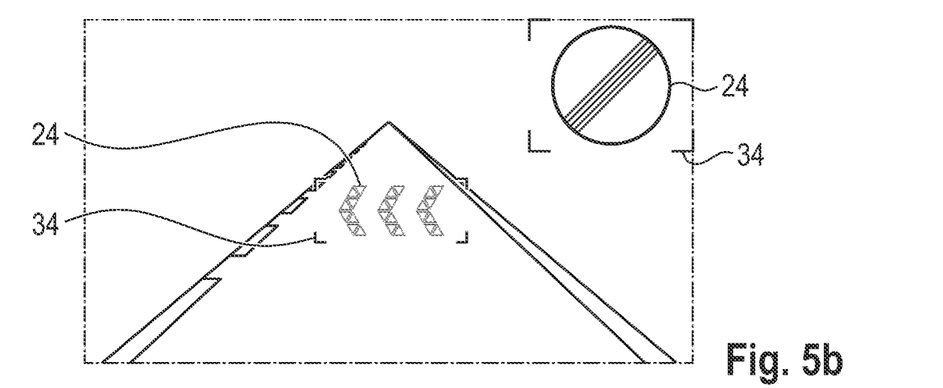
Figure 5C:
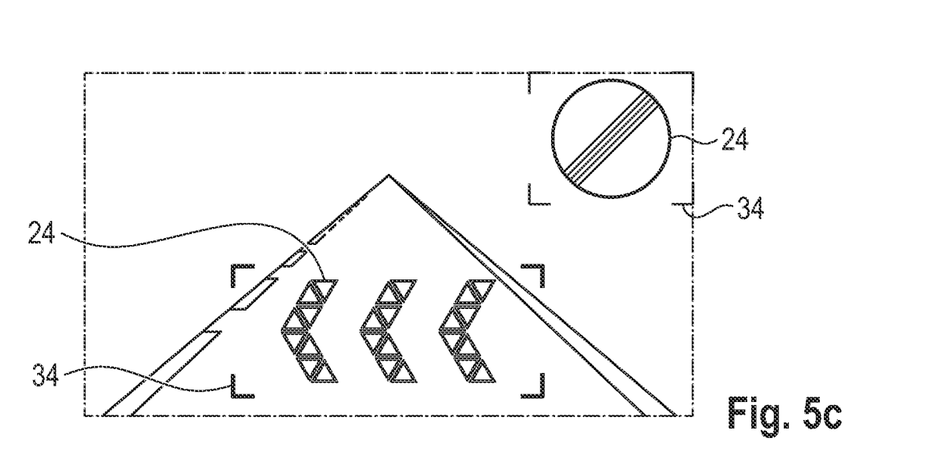

In FIGS. 5a to 5c, output in the form of notices 24 from the system 18 are schematically shown on an AR display 20 and are placed in information containers 34. A time sequence of a trip of a motor vehicle 28 from the driver's perspective is schematically shown in FIGS. 5a to 5c.

In the situation shown in FIG. 5a, a navigation notice 24 is located far in front of the motor vehicle 28. The navigation notice comprises a maneuver arrow to the left. Another notice 24 comprises the information that there is no more restriction on the route and is shown in the form of a traffic sign. This notice 24 is located closer to the motor vehicle 28 than the maneuver arrow.

In the situation shown in FIG. 5b, the navigation notice 24 is located closer to the motor vehicle 28. This impression is achieved by showing the navigation notice 24 larger. For example, the size of the navigation notice 24 may vary with the speed and/or traveled route of the motor vehicle 28 so that the impression arises that the navigation notice 24 is in a fixed location in front of the motor vehicle 28, and the motor vehicle 28 is approaching the navigation notice 24. The notice 24 with the information that there is no more restriction on the route is located directly in front of the motor vehicle 28 and is still displayed in front of the motor vehicle 28 afterwards as if the motor vehicle 28 is pushing the notice 24 in front of it. Of course it may also be provided to hide the notice 24 after a predefined and for example configurable time span. For example, the notice 24 that there is no more restriction on the route is located where there is no more restriction on the route.

In the situation shown in FIG. 5c, the navigation notice 24 is located directly in front of the motor vehicle 28. This is to convey that a lane change or turning maneuver should be performed. The navigation notice 24 is for example no longer displayed after passing since the turn or lane change has been performed. Even if no action is necessary, the navigation notice 24 is no longer displayed since it is no longer valid. The validity of the navigation notice 24 is conveyed by the location and the increasingly larger representation. The notice 24 with the information that there is no more restriction on the route is still valid and may therefore still be displayed. Of course, the driver may acknowledge by a control entry that he has received the notice 24, and it will stop being displayed. Moreover, it may be provided that the notice 24 disappears after a predefined time span.

Alternatively, the following process may also be performed to show a notice 24. The notice 24 is placed vertically similar to a signpost that contains the notice 24 and is positioned by AR for example one meter above the roadway surface. The notice 24 is modified by AR as long as it is in the field of vision of the passenger/driver. If the notice 24 would leave the field of vision because of the AR modification, the notice is moved to the closest edge of the field of vision. An AR modification comprises for example changing a size of the notice 24 with the covered route or the traveled speed so that the impression arises of approaching the notice 24.

The notice 24 is located at a distance from the position of the motor vehicle 28. This yields an icon size of for example at least 60 pixels. The size may be configured. A character height of the notice 24 may be correspondingly scaled.

A time span for displaying may for example be 266 ms. The notice 24 is for example enlarged until the maximum font size is reached. The notice 24 may keep its maximum size for example 1,000 ms before it is faded within 266 ms for transparency.

If the motor vehicle 28 reaches 0 km/h, a timer may start, wherein after for example a time span of 1,000 ms of V=0 km/h, the notice (as described above) is faded until complete transparency. If the motor vehicle 28 starts moving within a shorter period, the notice 24 is still displayed, and the procedure is continued.

A starting size of the notice 24 may for example be determined depending on the ego speed. For example at very low speeds, for example in a traffic jam, an increase in size from a minimum value to a maximum value may for example last 60 seconds. To counteract this, the start size should depend on the ego speed.

If the motor vehicle 28 is operated without active route guidance, the system 18 does not know which way the motor vehicle 28 will take. Consequently, it is difficult to fixedly locate the notice 24. For example, an implementation may then be used with a lance analogy. In this case, the notice 24 is shown in front of the motor vehicle 28 as if the notice 24 were attached to a tip of a lance extending out of the motor vehicle 28 in the driving direction. The length of the lance (not shown) may be used to generate an AR effect. In doing so, the length of the lance decreases with the traveled route so that the notice 24 comes closer to the motor vehicle 28, i.e., is shown larger. For example, the integral of the speed may serve as a measure for the travel route.

The perceptible change in size of the notice 24 should reflect the speed, and the longitudinal position of the notice 24 should directly and dynamically reflect the speed of the motor vehicle 28. That is, the notice 24 should get larger as the speed increases. Accordingly, a curve does not have any effect on the depiction of the notice 24, wherein for example only the traveled route and the speed have an effect.

Of course, the aforementioned sizes and time spans are only chosen by way of example and can, for example, be configured.

Figure 6:
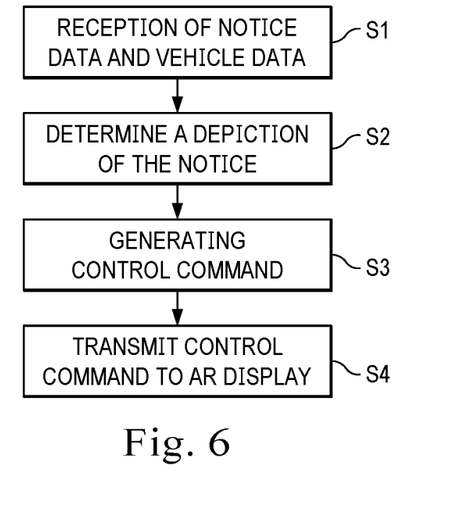
FIG. 6 shows a schematic example depiction of the steps of a method for the improved visualization of a notice in a motor vehicle.

FIG. 6 schematically portrays the steps of a method according to the present aspect for the improved visualization of a notice 24 in a motor vehicle 28. The method may for example be executed with a system 18 and/or a device 10 as described above.

In a first step S1, there is a reception of notice data with information on the notice 24 and vehicle data with information on a vehicle state.

In a second step S2, a depiction of the notice 24 based on the notice data and the vehicle data is determined.

In a third step S3, a control command is generated to control an AR display 20 based on the output configuration.

In a fourth step S4, the control command is then transmitted to the AR display 20.

The control command causes a dynamic depiction of the notice 24, wherein a validity range may be conveyed for the notice 24 by using the dynamics of the depiction of the notice 24.

The invention has been described in detail in the preceding. The described embodiments are examples to better understand the invention. A person skilled in the art will recognize that the invention may be applied to a great number of information and requests for the driver to be conveyed by notice icons. Moreover, a person skilled in the art will recognize that an application with several notice icons is also possible.

LIST OF REFERENCE NUMERALS

10 Device
12 Input interface
14 Analysis circuit
16 Output interface
18 System
20 Augmented reality/AR display
22 Projection unit
24 Notice
26 Front windshield
28 Motor vehicle
30 Vehicle system
32 Front camera
34 Information container
S1-S4 Method steps The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "for example" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A device for visualization of a notice being provided in a motor vehicle, the device comprising:
    an input interface for receiving notice data with information on the notice and vehicle data with information on a vehicle state;
    an analysis circuit for determining a depiction of the notice based on the notice data and the vehicle data, and for generating one or more control commands to control an augmented reality display based on the depiction of the notice; and
    an output interface for transmitting the control command to the augmented reality display, wherein
        the one or more control commands are generated to cause a dynamic depiction of the notice,
        the dynamic depiction visualizes the notice on the augmented reality display, and wherein
        a size of the dynamic depiction is dynamically changed, so that the notice appears to be fixed to a physical location in an environment of the vehicle.

2. The device of claim 1, wherein the augmented reality display comprises-an augmented reality head-up display.

3. The device of claim 2, wherein the analysis circuit is configured to generate one or more control commands that cause the notice to comprise a depiction of a countdown.

4. The device of claim 2, wherein the dynamic depiction conveys a validity range for the notice, wherein the validity range comprises one or more of a locality-, time- and vehicle state-dependent validity.

5. The device of claim 2, wherein the input interface is configured to receive vehicle data with information on a vehicle state, wherein the vehicle state comprises one or more of a speed, an orientation, and a position of the motor vehicle.

6. The device of claim 1, wherein the analysis circuit is configured to generate one or more control commands that cause the notice to comprise a depiction of a countdown.

7. The device of claim 6, wherein the dynamic depiction conveys a validity range for the notice, wherein the validity range comprises one or more of a locality-, time- and vehicle state-dependent validity.

8. The device of claim 6, wherein the input interface is configured to receive vehicle data with information on a vehicle state, wherein the vehicle state comprises one or more of a speed, an orientation, and a position of the motor vehicle.

9. The device of claim 1, wherein the dynamic depiction conveys a validity range for the notice, wherein the validity range comprises one or more of a locality-, time- and vehicle state-dependent validity.

10. The device of claim 9, wherein the input interface is configured to receive vehicle data with information on a vehicle state, wherein the vehicle state comprises one or more of a speed, an orientation, and a position of the motor vehicle.

11. The device of claim 1, wherein the input interface is configured to receive vehicle data with information on a vehicle state, wherein the vehicle state comprises one or more of a speed, an orientation, and a position of the motor vehicle.

12. The device of claim 1, wherein the notice is in the form of an information container.

13. The device of claim 1, wherein the analysis circuit is configured to generate one or more control commands which cause the notice to disappear from the augmented reality display upon reaching its physical location in the environment.

14. The device of claim 1, wherein the augmented reality display comprises an augmented reality head-up display, which is configured to be installed in a motor vehicle.

15. The device of claim 1, wherein the augmented reality display comprises an augmented reality head-up display, which is part of one or more of an onboard computer, infotainment system, and navigation system.

16. The device of claim 1, wherein the analysis circuit is configured to generate one or more control commands that cause the notice to comprise a depiction of a countdown, wherein the countdown is graphically depicted as one or more of a bar display and a numerical percentage display.

17. The device of claim 1, wherein the analysis circuit is configured to generate the one or more control commands to:
    cause the notice to disappear from the augmented reality display upon the motor vehicle reaching the physical location in the environment based on whether the notice comprises temporarily relevant information; or to
    cause the notice to remain visible on the augmented reality display appearing to be in front of the motor vehicle when the motor vehicle reaches the physical location in the environment.

18. A system for visualization of a notice being provided in a motor vehicle, the system comprising:
    an input interface for receiving notice data with information on the notice and vehicle data with information on a vehicle state;
    an analysis circuit for determining a depiction of the notice based on the notice data and the vehicle data, and for generating one or more control commands to control an augmented reality display based on the depiction of the notice;
    an output interface for transmitting the control command to the augmented reality display; and
    the augmented reality display for outputting a dynamic depiction of the notice in reaction to a control command from the device, wherein
        the one or more control commands are generated to cause a dynamic depiction of the notice,
        the dynamic depiction visualizes the notice on the augmented reality display, and wherein
        a size of the dynamic depiction is dynamically changed, so that the notice appears to be fixed to a physical location in an environment of the vehicle.

19. A method for visualization of a notice being provided in a motor vehicle, the method comprising:
    receiving notice data with information on the notice and vehicle data with information on a vehicle state;

determining a depiction of the notice based on the notice data and the vehicle data;

generating one or more control commands for controlling an augmented reality display based on the depiction of the notice; and transmitting the control command to the augmented reality display, wherein the one or more control command cause a dynamic depiction of the notice,     the dynamic depiction visualizes the notice on the augmented reality display, and wherein     a size of the dynamic depiction is dynamically changed, so that the notice appears to be fixed to a physical location in an environment of the vehicle.

20. A non-transitory medium with instructions that cause a computer or a computing unit to execute the method of claim 19.

\* \* \* \* \*